US007869826B2

(12) United States Patent
McElwain et al.

(10) Patent No.: US 7,869,826 B2
(45) Date of Patent: Jan. 11, 2011

(54) METHOD AND APPARATUS FOR RELATING COMMUNICATIONS SYSTEM IDENTIFICATIONS (SIDS)

(75) Inventors: John McElwain, Fort Worth, TX (US); Petri Katekeetta, Oulu (FI)

(73) Assignee: Nokia Corporation, Espoo (FI)

( * ) Notice: Subject to any disclaimer, the term of this patent is extended or adjusted under 35 U.S.C. 154(b) by 2168 days.

(21) Appl. No.: 09/965,784

(22) Filed: Sep. 27, 2001

(65) Prior Publication Data

US 2003/0022689 A1      Jan. 30, 2003

Related U.S. Application Data

(60) Provisional application No. 60/298,749, filed on Jun. 15, 2001.

(51) Int. Cl.
*H04M 1/00* (2006.01)

(52) U.S. Cl. .................. 455/551; 455/435.2; 455/517; 455/552.1

(58) Field of Classification Search .............. 455/412.1, 455/415, 426.1, 426.2, 435.2, 517, 552.1, 455/514, 551
See application file for complete search history.

(56) References Cited

U.S. PATENT DOCUMENTS

| | | | | |
|---|---|---|---|---|
| 4,916,728 | A | | 4/1990 | Blair .......................... 379/59 |
| 5,404,355 | A | * | 4/1995 | Raith ......................... 370/311 |
| 5,442,806 | A | | 8/1995 | Barber et al. .............. 455/33.1 |
| 5,815,807 | A | * | 9/1998 | Osmani et al. .............. 455/410 |
| 5,903,832 | A | | 5/1999 | Seppanen et al. |
| 5,920,821 | A | * | 7/1999 | Seazholtz et al. ........... 455/466 |
| 5,950,130 | A | | 9/1999 | Coursey |
| 5,983,115 | A | * | 11/1999 | Mizikovsky ................. 455/512 |
| 6,141,551 | A | * | 10/2000 | Guruparan et al. .......... 455/434 |
| 6,148,197 | A | | 11/2000 | Bridges et al. .............. 455/432 |
| 6,195,532 | B1 | | 2/2001 | Bamburak et al. ......... 455/31.1 |
| 6,397,064 | B1 | * | 5/2002 | Bridges et al. ........... 455/432.3 |
| 6,625,451 | B1 | * | 9/2003 | La Medica et al. .......... 455/434 |

(Continued)

FOREIGN PATENT DOCUMENTS

EP           0 779 751 A2    6/1997

*Primary Examiner*—Tuan H Nguyen
(74) *Attorney, Agent, or Firm*—Harrington & Smith

(57) ABSTRACT

A method for relating a plurality of system identifications (SIDs) in a mobile device is provided. The method includes the steps of identifying a plurality of SIDs having a common spatial characteristic, storing the identified plurality of SIDs, comparing a SID received from a wireless service provider to the stored plurality of SIDs and, upon any one of the plurality of stored SIDs matching the received SID, declaring the wireless service provider as being a Home service provider. The common spatial characteristic can be postal zone, such as one identified by a ZIP code. In the preferred embodiment the steps of identifying, storing, comparing and declaring are executed only if the mobile station is classified as being in a Prepaid mode of operation. If none of the plurality of stored SIDs matches the received SID, the method further compares the received SID to other stored SIDs, including at least one of a Partner SID, a Favored SID and a Forbidden SID. Alternatively, or in conjunction with comparing received SIDs for the case where none of the plurality of stored SIDs matches the received SID, the method further compares a received System Operator Code (SOC) to stored SOCs, including at least one of a Home SOC, a Partner SOC, a Favored SOC and a Forbidden SOC.

33 Claims, 6 Drawing Sheets

U.S. PATENT DOCUMENTS

| | | | |
|---|---|---|---|
| 6,807,418 B2 * | 10/2004 | Bamburak et al. | 455/435.2 |
| 2001/0000777 A1 * | 5/2001 | Mcgregor et al. | 455/406 |
| 2003/0186695 A1 * | 10/2003 | Bridges et al. | 455/432 |
| 2004/0214572 A1 * | 10/2004 | Thompson et al. | 455/435.2 |
| 2005/0159107 A1 * | 7/2005 | Mauney et al. | 455/41.2 |

* cited by examiner

METHOD AND APPARATUS FOR RELATING COMMUNICATIONS SYSTEM IDENTIFICATIONS (SIDS)

CLAIM OF PRIORITY FROM A COPENDING PROVISIONAL PATENT APPLICATION

Priority is herewith claimed under 35 U.S.C. §119(e) from copending Provisional Patent Application No. 60/298,749, filed Jun. 15, 2001, entitled "System Selection Technique for Prepaid Communications", by John McElwain and Petri Katekeetta. The disclosure of said Provisional Patent Application is incorporated by reference herein in its entirety.

BACKGROUND OF THE INVENTION

1. Field of the Invention

This invention relates generally to wireless telecommunication networks wherein multiple wireless systems or service providers are capable of servicing a particular mobile terminal or mobile station, and pertains more specifically to methods and apparatus for the mobile station to select a particular wireless service provider from which service is to be obtained.

2. Prior Art

The specification of system selection protocols has been an ongoing effort for a number of years in the wireless telecommunications field, in particular in the cellular telephone area. For example, in the AMPS system the mobile station is given a choice between possible serving systems based on the system identification (SID) parameter, wherein in one technique the mobile station is enabled to identify and select its Home system when it is encountered. Another technique involves setting a certain frequency band preference to control the band scanning process. For example, possible band preferences may be: scan only the A band, scan only the B band, scan only the band containing the Home SID (A or B), or a standard technique, where the Home band is scanned first, followed by the other band.

Another development is referred to as Intelligent Roaming, which is an expansion of the positive/negative SID list technique. In the Intelligent Roaming approach various mechanisms are provided to: use a broadcast System Operator Code (SOC) as well as the SID to prioritize systems; provide for three different priorities (in addition to Home and Unidentified); for prioritizing the 800 MHz and 1900 MHz bands for scanning; for transitioning to a more preferred system when camped on a less preferred system; and for controlling the display of system identification text (using the so-called alpha-tags). When using the broadcast SOC and the SID the mobile station maintains one list for each, and configurable arbitration is used to control selection when the SID and SOC have different priorities.

One benefit of using the SOC is a reduction in database size, as the SOC(s) for a particular operator do not change between different areas (like the SID). As such, one SOC entry in the mobile station database can encompass all systems belonging to a specific operator, which could require a prohibitive number of SID entries to achieve the same result. When combined with the area-specific system designation of the SID, this technique provides a means to assign a general priority for a particular operator (based on the SOC), while also providing area-specific exceptions (based on the SID).

Intelligent Roaming provides five different system classes or priorities that, in descending priority order are: Home (SID or SOC); Partner; Favored; Neutral (designated by a failure to match SID parameters in the mobile station's database; and Forbidden (utilized only to make emergency calls). The Partner priority provides a method to set multiple SID and SOC entries in the database with an equivalent priority with the HOME SID and SOC.

The Favored priority provides a method for having two preferred systems in the same area with one, the Favored system, serving as a less desirable backup for the other (the Home or Partner system).

In the current North American cellular system, any given market area may be serviced by up to two competing service providers of cellular air time communication services (wireless carriers). By Federal Communications Commission (FCC) regulations, the two competing wireless carriers are assigned different groups of frequencies through which services are provided. A frequency set typically includes control channels and voice channels. The control channels are used for preliminary communications between a mobile station and a cell site for setting up a call, after which a voice channel is assigned for the mobile station's use on that call. The assigned frequency sets are generally referred to as "A band frequencies" and "B band frequencies". Typically, the A band frequencies are reserved for non-wireline service providers, while the B band frequencies are reserved for the incumbent wireline service providers. While each frequency set for a given cellular service market area is assigned to only one service provider, in different market areas the same frequency set may be assigned to different service providers or companies.

Depending upon which wireless carrier the user of the mobile station subscribes to, the home frequency set of the user may correspond to the A frequency band or the B frequency band. Whenever the mobile station places a call, the unit will ordinarily attempt to use the home frequency set to establish the call. If a call is handled outside of the user's home market area, then the unit is said to be "roaming" and service will be attempted through a frequency set of a non-home service provider. Typically, the user's home service provider will have a roaming agreement or reciprocal billing arrangement with the non-home service provider to permit service to be extended to the user's mobile unit when it is roaming in the non-home service provider's market area.

The serving areas of mobile service in based on the system identification (SID) parameter. The mobile station is enabled to identify and select its home system when it is encountered.

A development in the wireless industry provided positive/negative SID lists, where the positive SID list contains SID information for desirable non-home systems, while the negative SID list contains SID information for those systems that are to be used only in the event an emergency call needs to be originated by the mobile station. This technique may be used in conjunction with Home SID/band preferences discussed above to provide a desired scanning order with restrictions. An example of a mobile station that utilizes negative SIDs is disclosed by Blair, U.S. Pat. No. 4,916,728. As an alternative to negative SIDs, some mobile stations are programmed with positive or preferred SIDs. Positive or preferred SIDs are SIDs on which the mobile station should attempt to obtain service when selecting a cellular carrier frequency. An example of a mobile station that utilizes preferred SIDs is disclosed by Barber et al., U.S. Pat. No. 5,442,806. The uses of preferred SIDs facilitate the selection of a preferred service provider when the mobile station is roaming.

Another development in the wireless industry is to offer prepaid wireless services. An example of a provider of prepaid wireless service is TracFone™ Wireless, Inc., which functions as a reseller of airtime from various carriers in the United States.

Such resellers may obtain their customers by selling mobile stations to retailers who in turn sell the mobile stations to the end user. Once the end user buys the mobile station, the end user contacts the reseller's customer service for activation of the handset. Contact can be made with a phone call or through a website. The customer is then asked to provide the Phone Serial Number (ESN) and the postal ZIP Code of the area where the customer will be using the mobile station most often. The determination of the carrier to be utilized for that specific end user is controlled by resell agreements with the carriers in the customer's indicated location of use, as determined by the ZIP code. Based on the wireless carrier that is selected for the entered ZIP code, a home SID is loaded into the customer's phone.

However, geographical areas described by postal ZIP codes do not necessarily correspond to the geographical service areas provided by cellular communication systems. For example, the selected wireless provider may serve only a portion of the geographical area that was indicated by the customer as being the customer's "home area", and in all other portions of the customer's "home area" another service provider or providers may be required, thereby resulting in the customer paying roaming undesirable roaming charges.

Thus, a need exists to more closely relate the communications home area of the mobile station to the end user's home ZIP code.

A need also exists to avoid roaming charges when a customer of a prepaid wireless communications system provider operates within a geographical area that was designated by the prepaid wireless communications system provider as being the customer's home area.

SUMMARY OF THE INVENTION

The foregoing and other problems are overcome, and other advantages are realized, in accordance with the presently preferred embodiments of these teachings.

In accordance with one embodiment of the invention a method for relating a plurality of system identifications (SIDs) in a mobile device is provided. The method includes the steps of identifying a plurality of SIDs having a common spatial characteristic, storing the identified plurality of SIDs, comparing a SID received from a wireless service provider to the stored plurality of SIDs and, upon any one of the plurality of stored SIDs matching the received SID, declaring the wireless service provider as being a Home service provider. The common spatial characteristic can be postal zone, such as one identified by a ZIP code. In the preferred embodiment the steps of identifying, storing, comparing and declaring are executed only if the mobile station is classified as being in a Prepaid mode of operation.

If none of the plurality of stored SIDs matches the received SID, the method further compares the received SID to other stored SIDs, including at least one of a Partner SID, a Favored SID and a Forbidden SID. Alternatively, or in conjunction with comparing received SIDs for the case where none of the plurality of stored SIDs matches the received SID, the method further compares a received System Operator Code (SOC) to stored SOCs, including at least one of a Home SOC, a Partner SOC, a Favored SOC and a Forbidden SOC.

The method may further display a message to a user for informing the user that the user is operating in the Pepaid mode with one of a plurality of system providers having SIDs that are associated with a geographical area that is the user's home geographical area.

In accordance with another embodiment of the invention a method for prepaid communication system selection is provided. The method includes receiving a communication system descriptor and comparing the communication system descriptor to a descriptor list; where the descriptor list includes system descriptors of one or more service providers that service a geographical area that has been selected as the user's home geographical area. A next step determines a service provider category as a result of the comparison.

The foregoing methods may be practiced by supplying program instructions readable by a machine. The program instructions are stored in one or more program storage devices. Apparatus for practicing these methods is also an aspect of these teachings.

Objects of this invention include, but are not be limited to, providing an ability to more closely relate the communications home area of the mobile station to the end user's predefined area of operation, such as one defined by a postal code, as well as providing an ability to avoid roaming charges when a customer of a prepaid wireless communications system provider operates within a geographical area that was designated by the prepaid wireless communications system provider as being the customer's home area.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
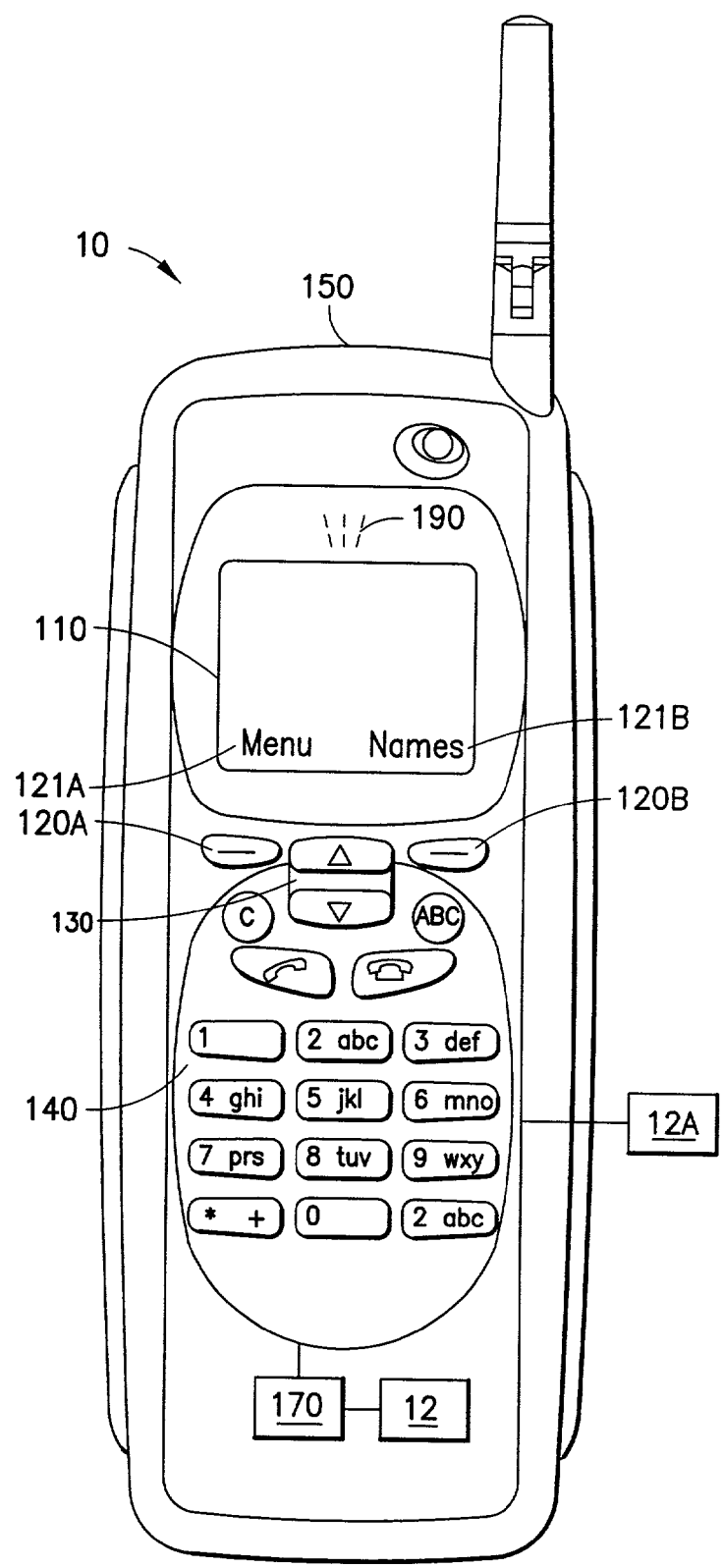
FIG. 1 is an illustration of a mobile station in accordance with an embodiment of the present invention.

Referring to FIG. 1 there is shown a pictorial representation of a mobile station 10 incorporating features of this invention. Mobile station 10 comprises a display 110 that displays data, menus and areas for softkey functions 121A and 121B that can be activated by pressing of softkeys 120A and 120B. Scroll keys 130 are also provided to scroll through menu items featured on display 110. Scroll keys 130 may also be a rolling cylinder, ball or the like which will allow for scrolling through items displayed. Keyboard 140 operates for the input of data. The keys of keyboard 140 may also be illuminated by various methods known to those skilled in the art to produce a visual reminder in response to an event. Entry of data may be facilitated by the use of predictive keyboard entry that is known by those skilled in the art. Data is stored in a memory 12. Memory 12 may include volatile Random Access Memory (RAM) including a cache area for the temporary storage of data. Mobile station 10 may also comprise non-volatile memory 12A which may be embedded or which may be removable, such as a removable Subscriber Identification Module (SIM). Non-volatile memory 12A may be EEPROM or flash memory and the like available from, by example, SanDisk (Sunnyvale, Calif.) or Lexar Media (Fremont, Calif.). Memories 12 and 12A include storage locations storing data and instructions that controls the operation of processor 170 to implement functions according to embodiments of the invention. Processor 170 generates appropriate commands and controls the other component blocks of mobile station 10. Mobile station 10 also comprises a speaker 190. The display may also be a virtual display such as is provided by MicroVision (Seattle, Wash.).

Figure 2:
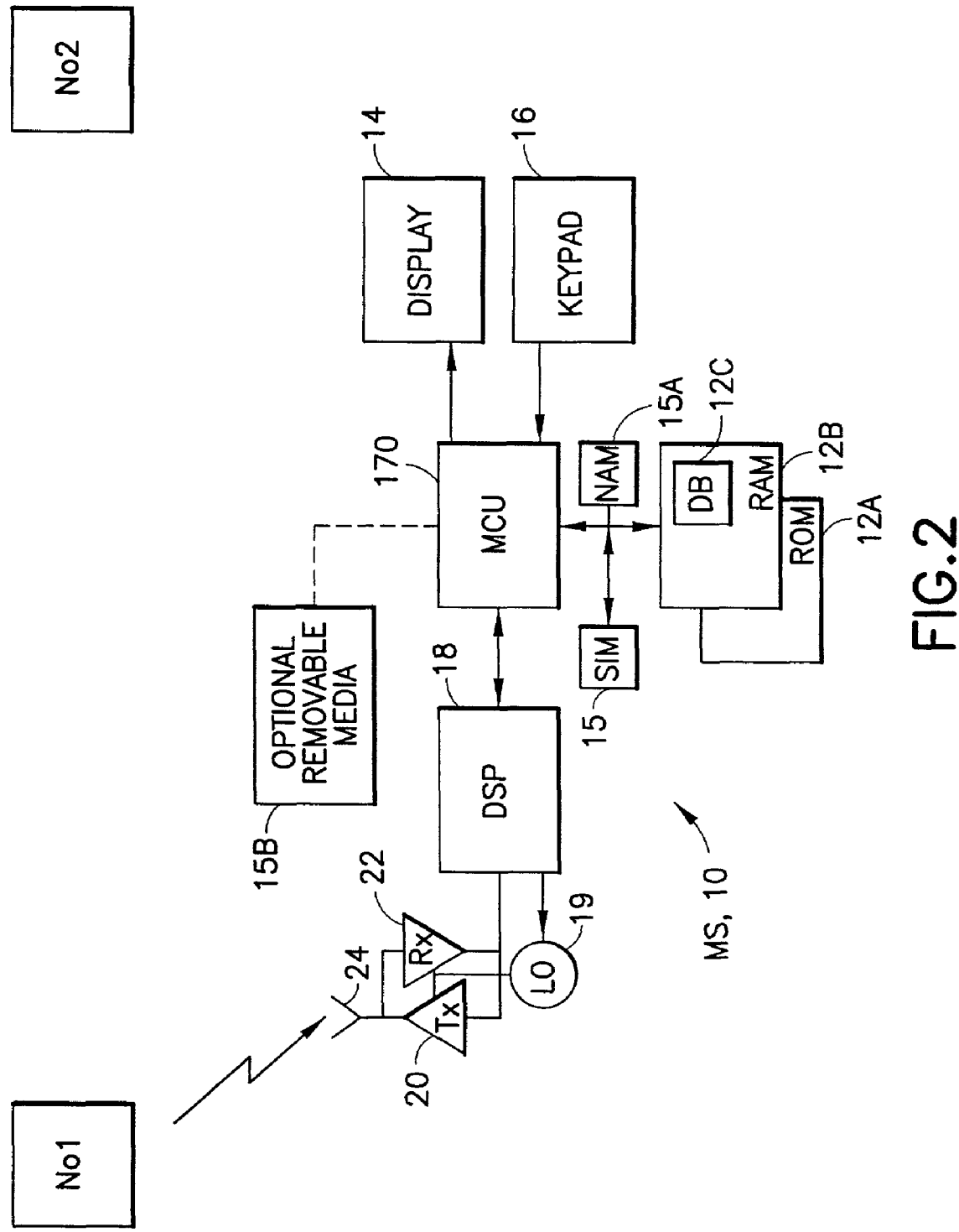
FIG. 2 is a simplified block diagram showing a wireless telecommunications system incorporating features of the present invention.

Referring to FIG. 2, therein is illustrated a simplified block diagram of an embodiment of mobile station 10 that is suitable for practicing this invention. FIG. 2 also shows a first network operator (NO1), also referred to herein simply as a first system, that transmits in a forward or downlink direction both physical and logical channels to the mobile station 10 in accordance with a predetermined air interface standard or protocol.

For more information on network interface standards such as the Interim Standard 41 (IS-41), see, for example, TIA/EIA-IS-41.5-C, Cellular Radiotelecommunications Intersystem Operations: Signaling Protocols, Telecommunications Industry Association, February 1996. For more information on air-interface standards such as Interim Standards 95 and 136(IS-95 and IS-136), see, for example, TIA/EIA-IS-95-A, Mobile Station-Base Station Compatibility Standard for Dual-Mode Wideband Spread Spectrum Cellular Systems, Telecommunications Industry Association, May 1995; TIA/EIA-IS-136.1-A, TDMA Cellular/PCS-Radio Interface-Mobile Station-Base Station Compatibility-Digital Control Channel, Telecommunications Industry Association, October 1996; TIA/EIA-IS-136.2-A, TDMA Cellular/PCS-Radio Interface-Mobile Station-Base Station Compatibility-Traffic Channels and FSK Control Channel, Telecommunications Industry Association, October 1996; and TIA/EIA/IS-136.1-A-1, Addendum No. 1 to TIA/EIA/IS-136.1-A, Telecommunications Industry Association, November 1996. All the above standards publications are incorporated herein by reference.

In the presently preferred, but not limiting, embodiment, the protocol could conform to one of the above-mentioned ANSI-136, AMPS, CDMA or various ones of the GSM protocols, and/or to various modifications and enhancements thereto. In a typical case a second (and third, fourth, etc.) network operator (e.g., NO2 or second system) may also be capable of transmitting to the mobile station 10 using the same or a different protocol as NO1, although at any given time the mobile station 10 will be connected to only one network operator. However, when camped on a control channel of NO1 or NO2 the mobile station 10 may be scanning for the other. Although not specifically shown in FIG. 2, it is assumed that a reverse or uplink communication path exists from the mobile station 10 to the network operator that conveys mobile station 10 originated access requests, a traffic channel and the like.

The mobile station 10 typically includes a micro-control unit (MCU) 170 having an output coupled to an input of a display 14 and an input coupled to an output of a keyboard or keypad 16. The mobile station 10 may be considered to be a radiotelephone, such as a cellular telephone or a personal communicator having voice an/or packet data capabilities, or it may be a wireless packet data terminal. The mobile station 10 contains a wireless section that includes a digital signal processor (DSP) 18, or equivalent high-speed processor, as well as a wireless transceiver comprised of a transmitter 20 and a receiver 22, both of which are coupled to an antenna 24 for communication with the currently selected network operator. Some type of local oscillator (LO) 19, which enables the transceiver to tune to different frequency channels when scanning and otherwise acquiring service, may be controlled from the DSP 18. The MCU 170 is assumed to include or be coupled to a read-only memory (ROM) 12A for storing an operating program, as well as a random access memory (RAM) 12B for temporarily storing required data, scratchpad memory, etc.

A portion of the RAM 12B may be non-volatile, enabling data to be retained when power is turned off. The non-volatile portion of the RAM 12B is assumed to store a multi-protocol system selection database (DB) 12C that is organized and managed in accordance with the teachings herein. A separate removable SIM 15 can be provided as well, the SIM storing, for example, subscriber-related information. In some embodiments of this invention it may be preferred to store the database 12C in the SIM 15. In alternate embodiments the database 12C may be stored on another type of removable media 15B, such as a card containing a memory and/or a microprocessor, such as a "smartcard". The removable card could be similar to a phone card that is constructed and operated in accordance with these teachings.

For example, a retailer that sells the prepaid service provider's mobile stations 10 may program the Cousin SID list 200 (described below), under the direction of the prepaid service provider, directly into the memory of the mobile station 10, or it may be programmed into a removable card or module that is given to the customer along with the mobile station 10. Other information could be stored in the removable media 15B as well. Alternatively, the user or customer may program this information into the memory of the mobile station 10, under the direction of the prepaid service provider, such as by entering data in response to menu prompts or the like.

The mobile station 10 will typically include a memory device 15A, such as a number assignment module (NAM), in which an assigned phone number and a system identification code (SID) and/or System Operator Code (SOC) is stored to uniquely identify the home service provider for the unit. In the North American cellular system each provider within a market area is preferably assigned a distinct, fifteen bit SID. In alternate embodiments any suitable identifier may be used. IS-136 service providers are also assigned a 12-bit SOC for use throughout all their market areas. In Europe, on the other hand, the Global System for Mobile Communications (GSM) standard (see, for example, Recommendation GSM 02.11, Service Accessibility, European Telecommunications Standards Institute, 1992) defines a process for network selection based on the mobile station reading the GSM equivalent of the SID, called the Public Land Mobile Network (PLMN) identity.

In addition, reference may be had to U.S. patent application Ser. No. 09/538,774, filed on Mar. 30, 2000, entitled "Flexible, Feature-based System Selection Protocol". This patent application is assigned to assignee of the present application and is incorporated herein by reference in its entirety to the extent that it does not conflict with the teachings presented herein.

Figure 3:
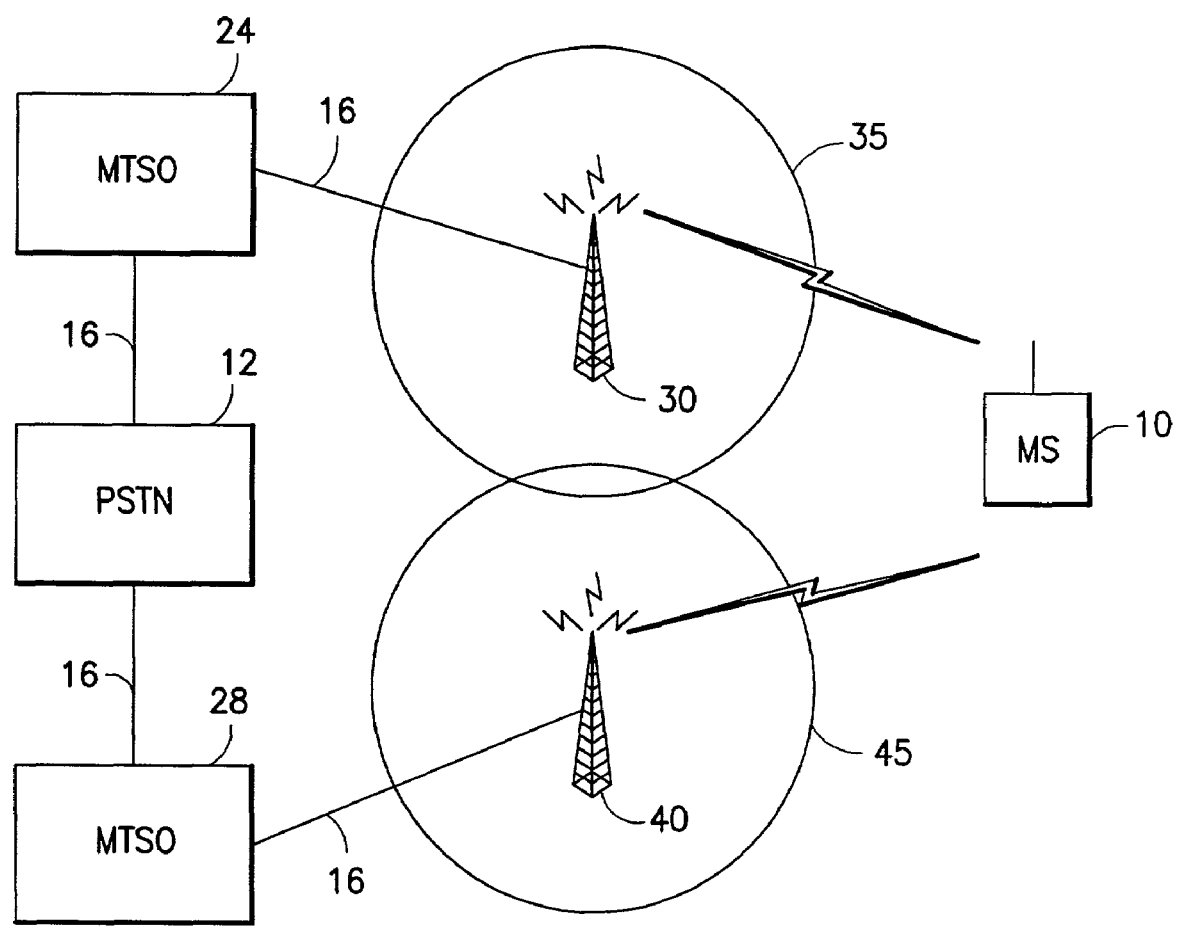
FIG. 3 is illustrative of the basic components of a cellular network system incorporating features of the present invention.

Referring also to FIG. 3 there is shown the basic components of a conventional cellular network. Mobile station 10 is depicted in FIG. 3 as being able to communicate with either cell site 30 or cell site 40, even though the mobile station is not illustrated as being located within cell coverage area 35 or cell coverage area 45. Under normal operating conditions, the extent to which mobile station 10 will be able to communicate with cell site 30 or cell site 40 will depend on the geographic location of the mobile station 10 and the size of the cell coverage area of each cell site. Further, although only two cell sites are depicted in FIG. 3, in a typical case the cellular network will include many more than two cell sites. In addition, more than one cell site may be connected to each MTSO 24,26.

The mobile station 10 may include a conventional cellular telephone unit with a transceiver and antenna to communicate by, for example, radio waves with cell sites 30 and 40. Cell sites 30 and 40 may both include a radio transceiver and be connected by landlines 16 or other communication links to MTSOs 24 and 28. The PSTN 12 is also connected to each MTSO 24 and 28 by landline 16 or other communication links.

The MTSOs 24 and 28 may be conventional digital telephone exchanges that control the switching between the PSTN 12 and the cell sites 30 and 40 to provide wireline-to-mobile, mobile-to-wireline and mobile-to-mobile call connectivity. The MTSOs 24 and 28 may also (i) process mobile station status data received from the cell site controllers; (ii) handle and switch calls between cells; (iii) process diagnostic information; and (iv) compile billing information. The transceiver of each cell site 30 and 40 provides communications, such as voice and data, with mobile station 10 while it is present within its coverage region or cell. The MTSOs 24 and 28 may track and switch mobile station 10 from cell site to cell site, as the mobile station 10 passes through various coverage areas. When mobile station 10 passes from one cell to another cell, the MTSO of the corresponding cell may perform a "hand-off" that allows the mobile station to be continuously serviced.

The SID or equivalent system identification number is broadcast by each cell site 30,40 and is used by the mobile station 10 to determine whether the mobile station is operating in its home network, or whether it is operating in a roaming condition. Conventionally, the mobile station 10 makes this determination by reading the SID (or System Operator Code (SOC)) that is broadcast in the cellular area where it is located, and comparing it to a stored Home SID (or SOC) stored in the NAM 15A.

Figure 4A:
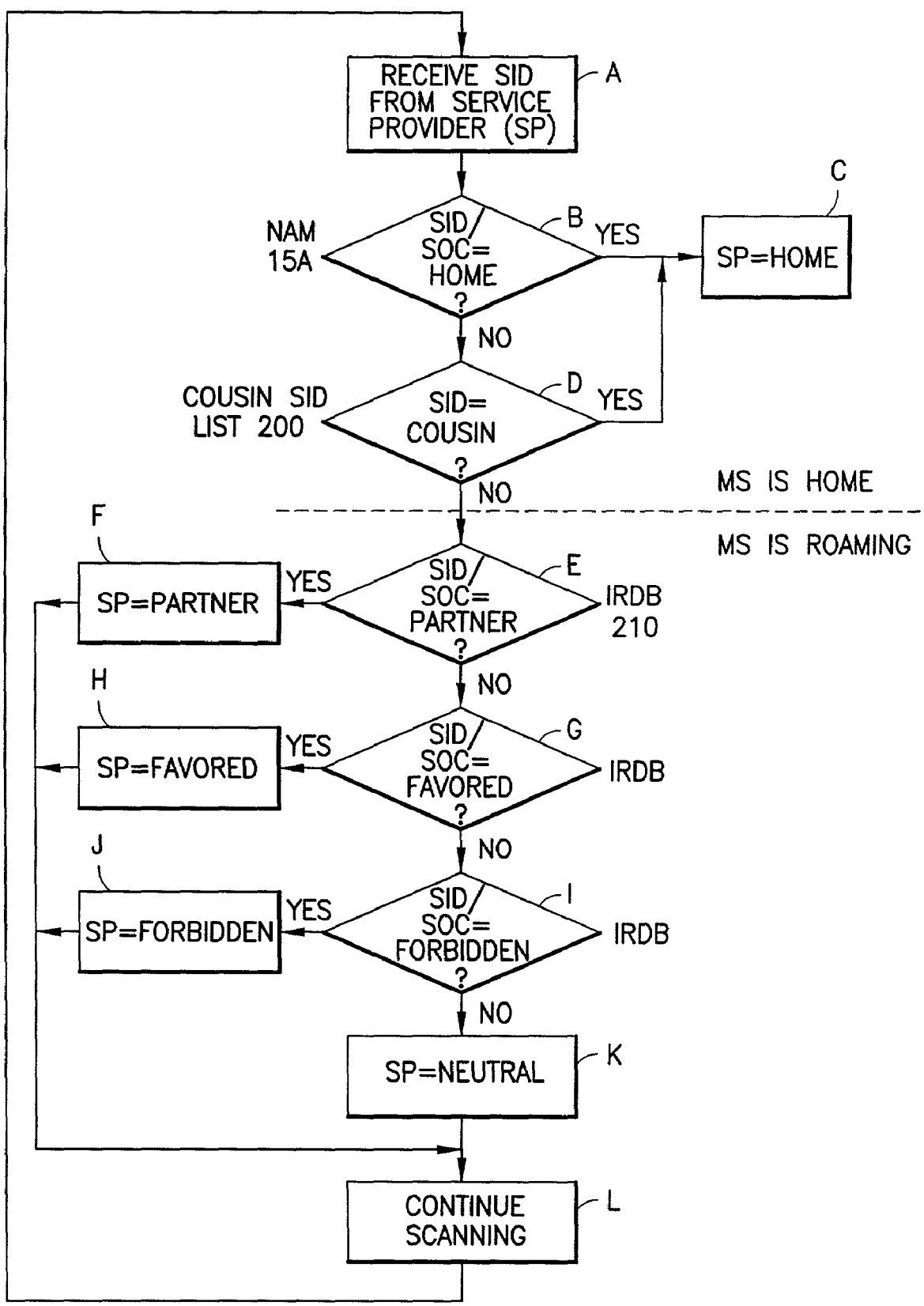
FIG. 4A is a flow chart illustrating method steps of a first embodiment of the invention shown in FIG. 5.
Figure 4B:
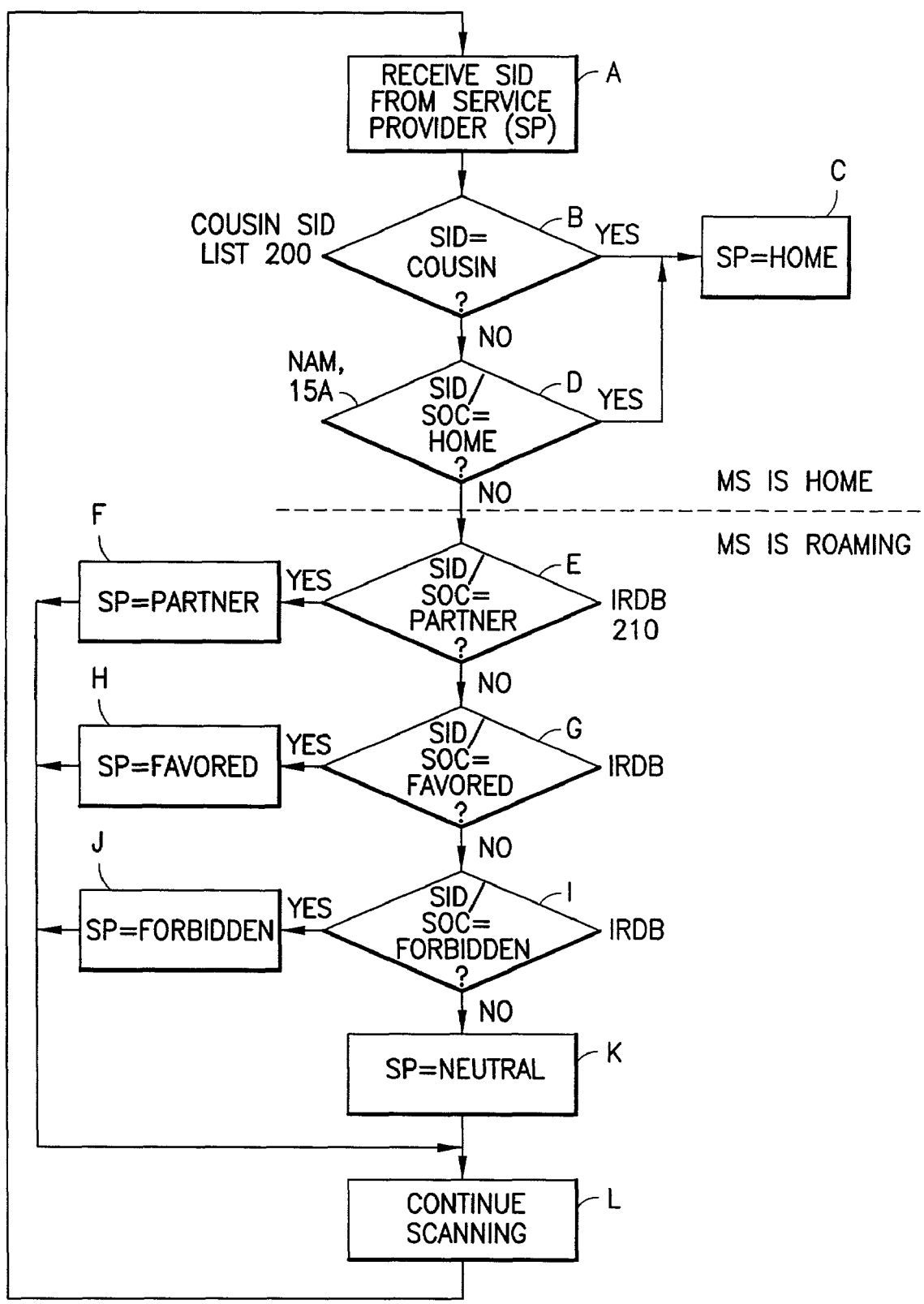
FIG. 4B is a flow chart illustrating method steps of a second embodiment of the invention shown in FIG. 5.
Figure 5:
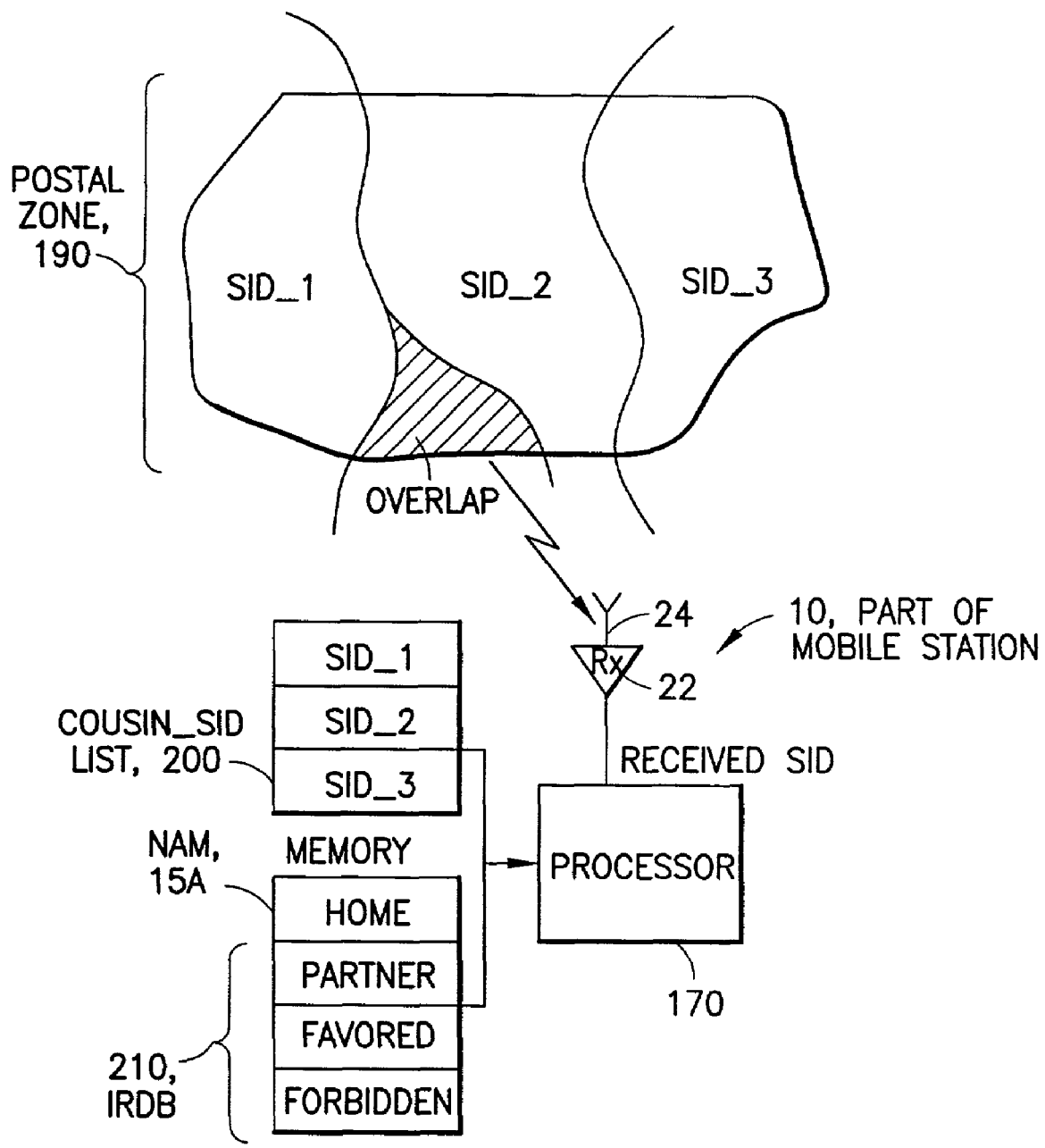
FIG. 5 depicts an exemplary geographical area that contains several SIDs and a mobile station that contains a Cousin SID list, in addition to a conventional IRDB and a NAM.

Referring now to FIGS. 4A, 4B and 5, in the preferred embodiment of the present invention a plurality of geographically-related SIDs are stored in a list or database referred to herein for convenience as a Cousin SID list 200. If the received SID matches any one of the stored SIDs in the Cousin SID list 200, the mobile station 10, when operating in the prepaid mode, makes the determination that the catagory of the associated service provider is a Home service provider, and that the mobile station 10 is not roaming.

For example, referring to FIG. 5 assume that the prepaid user or subscriber's postal zone 190 is as shown. The postal zone could correspond with the ZIP code of the user's residence or place of business. In other embodiments other techniques could be used for defining a geographical area on the surface of the earth, such as by employing the user's landline telephone exchange number, or specifying some predetermined area such as "downtown" or "business park", etc. Alternatively, based on a user-provided address, such as the address of the user's residence or place of business, a circle having a predetermined radius r could be drawn that is centered on the address, and the area within the circle then becomes the user's home area. A given geographical area may cross boundaries of several postal zones or zip codes, as well as other types of boundaries. In any case, within the geographical area so defined there are a plurality of SIDs (e.g., SID_1, SID_2, SID_3). The SIDs could all be associated with the same service provider, or they may each be associated with a different service provider, it being remembered that the prepaid wireless service provider will typically have business relationships with a number of different wireless service providers, or two of the SIDs could be associated with one service provider and another one or others associated with other service provider(s). The coverage of the SIDs may overlap within the defined geographical area, especially if the SIDs are associated with different service providers. In FIG. 5 it can be seen that SID_1 and SID_2 overlap within the postal zone 190.

Referring also to FIG. 4A there is shown a flow chart illustrating method steps in accordance with a first embodiment of these teachings. At Step A, and as a result of initial turn-on or during system scanning, the mobile station 10 receives a SID, and may also receive a SOC. At Step B the mobile station 10 compares the received SID/SOC to a stored SID/SOC in the NAM 15A that is defined as the Home service provider (SP) of the mobile station 10. If a match occurs control passes to Step C, where the SP is declared to be the Home SP. If a match does not occur, and in accordance with an aspect of these teachings, control passes instead to Step D where the received SID is compared to the one or more SIDs stored in the Cousin SID list 200. The SIDs in the Cousin SID list 200 were prestored under control or direction of the prepaid service provider, and are intended to represent a plurality of SIDs belonging to one service provider, or SIDs belonging to different service providers, that serve the geographical area defined by, for example, the postal zone 190. If the received SID matches any one of the SIDs stored in the Cousin SID list 200, then control passes to Step C, and the SP category is declared to be Home. At this point the mobile station 10 is assumed to not be roaming, and further scanning for other service providers may be inhibited.

If a match does not occur in Step D, then the mobile station 10 can be assumed to not be located in the geographical region defined by, for example, the postal zone 190 (i.e., the mobile station 10 is roaming), and conventional intelligent roaming database (IRDB) table 210 operations can be performed. For example, at Step E the received SID/SOC is compared to a Partner SID/SOC, and if a match is found control passes to Step F where the SP is declared to be Partner. If a match is not found control passes to Step G. At Step G the received SID/SOC is compared to a Favored SID/SOC, and if a match is found control passes to Step H where the SP is declared to be Favored. If a match is not found control passes to Step I. At Step I the received SID/SOC is compared to a Forbidden SID/SOC (if present), and if a match is found control passes to Step J where the SP is declared to be Forbidden. If a match is not found control passes to Step K, where the service provider is declared to be Neutral. After Step K control may pass to Step L, as well as from any one of Steps F, H and in particular J, where the mobile station 10 continues to scan for a Home system or for a more preferred system if the Home system cannot be found. During this scanning, if the received SID matches any one of the SIDs stored in the Cousin SID list 200 when operating in the prepaid mode, the mobile station 10 declares the service provider to be the Home service provider. Any suitable scanning technique may be employed. For example, scanning may be continuous or non-continuous.

FIG. 4B is a flow chart that illustrates a method in accordance with a second embodiment of these teachings. In this embodiment the logic of steps B and D of FIG. 4A is reversed, such that the mobile station 10 first determines if the received SID is found in the Cousin SID list 200, and if not next determines if the received SID (or SOC) is found in the NAM 15A. If either test is affirmative, control passes to Step C to declare the service provider to be the Home service provider of the mobile station 10. As in the embodiment of FIG. 4A, at this point the mobile station 10 is assumed to not be roaming, and further scanning for other service providers may be inhibited. If a match does not occur in Step D, control passes to Step E and the operation thereafter can be identical to that described above for the embodiment of FIG. 4A.

Reference can also be made to the following pseudo-code for a description of Step D in FIG. 4A and Step B in FIG. 4B:

```
<begin "Prepaid SW">
/* cousin SID is checked from a separate list than IRDB */
.if cousin_sid match => SP category is Home
<end "Prepaid SW">
```

An affirmative identification results in the SP being identified as in the HOME category. The mobile station 10 preferably gives priority in system selection for the SIDs that reside in the cousin SID list 200 that is established by the prepaid service provider and maintained by the prepaid software (SW). The SIDs in the cousin SID list function as additional Home SIDs in the prepaid mode. The prepaid software accepts up to, for example, 18 additional SIDs, although more or less than 18 SIDs can be stored in the Cousin SID list 200.

When operating in a non-prepaid mode (i.e., in a conventional postpaid mode) the mobile station 10 preferably utilizes the standard methods of cellular system selection such that a negative identification by Step B of FIG. 4A results in the SP category being determined by the conventional IRDB 210, as illustrated by the following pseudo-code that corresponds to Steps E through J of FIGS. 4A and 4B:

```
.if partner_sid or partner_soc match => SP category is Partner
.if favored_sid or favored_soc match => SP category is Favored
.if forbidden_sid or forbidden_soc match => SP category is Forbidden
```

Further in accordance with these teachings the mobile station 10 may provide a visual or other display to the user to inform the user of the current service provider status. This can be done by displaying an alphatag, as shown by the following pseudo-code:

```
/* giving category information to the UI based on what alphatag is shown by UI
(names here are CS specific, UI uses own naming convention)*/
.UI_NOT_ROAMING /* Home */
.UI_NOT_ROAMING_PREPAID /* Cousin */
.UI_NOT_ROAMING_HOME_TYPE /* Partner */
.UI_ROAMING_SEMI_NON_HOME_TYPE /* Favored */
.UI_ROAMING_NON_HOME_TYPE /* Neutral */
```

If the broadcast and subsequently received SID does not match a SID in the SID list 200 (or the Home SID in the NAM 15A), then the mobile station is roaming, and the mobile station must attempt to gain service through a non-home service provider. Due to the imposition of a fixed surcharge or higher per unit rate, the airtime charges when the mobile station is roaming are customarily higher than when it is operating within its home network.

Operation under the roaming condition is often under the control of the mobile station user. The user may select whether the mobile station 10 will operate in a Home System Only, A Band Only, B Band Only, A Band Preferred, or B Band Preferred operating mode. The user typically controls the system preference and mode operation through menu choice or selection. This current method of roaming control is conventionally known as "Preferred System Selection". In the most common roaming situation, the mobile station 10 remains on the same band as the home cellular network. That is, if the mobile station 10 is homed to a cellular network with an odd numbered SID (which is normally assigned to an A band cellular service provider), then the mobile station will obtain service from the A band cellular service provider when roaming.

In accordance with these teachings more than one SID is incorporated into the mobile station 10, and multiple Cousin SIDs function as an aggregate home SID without affecting the operation of the intelligent roaming database (IRDB) table 210 in the mobile station 10. Additionally, embodiments of the invention enable mobile station resellers to configure the mobile station 10 to contain the reseller's SID list, in addition to the IRDB. Thus, a mobile station provider, such as a prepaid reseller, may provide a stored list of controlled SIDs (the Cousin SIDS), and the Cousin SID list 200 and the carrier-programmed IRDB 210 are enabled to operate in a mutually exclusive fashion.

One aspect of the teachings of this invention is an ability to provide different types of configurable parameters or elements to control how the mobile station 10 compares the various systems one to another, and then reacts once encountering and/or utilizing a certain system. These configurable elements include SID lists and supporting data fields that provide a means for associating a communications system broadcast with an operational mode.

Thus, the present invention advantageously defines a method and apparatus that allows the mobile station 10 to expand the home area of a prepaid end user to more closely relate the communications home area of the mobile station to the end prepaid user's desired geographical area of operation. Calls within the expanded home area may be made at a local rate instead of at a roaming rate, which satisfies at least one object of this invention.

The reference to postpaid and prepaid mobile station software modes can be interpreted to mean that in one case the mobile station 10 contains either postpaid or prepaid software (SW), and in another case that the mobile station 10 includes both types of software, and selection between operating in either the postpaid or the prepaid SW mode is made by setting a logical or hardware switch.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method comprising:
   storing a system identification that identifies a home service provider for a mobile station;
   identifying a plurality of system identifications having a common spatial characteristic;
   storing the identified plurality of system identifications in a memory that is accessible by a mobile station;
   comparing a system identification received from a wireless service provider to the stored plurality of system identifications; and
   upon any one of the plurality of stored system identifications matching the received system identification, declaring the wireless service provider as being a home service provider for the mobile station such that the mobile station is assumed to not be roaming and roaming charges are avoided, otherwise, if none of the plurality of stored system identifications matches the received system identification, further comprising comparing a received system operator code to stored system operator codes, including at least one of a partner system operator code, a favored system operator code and a forbidden system operator code and if a match is found between the received system operator code and one of the partner and favored system operator codes, declaring a wireless service provider corresponding to the matched one of the partner and favored system operator codes to be the home service provider.

2. A method as in claim 1, wherein the common spatial characteristic is comprised of a geographical area that corresponds to a postal zone.

3. A method as in claim 1, wherein the common spatial characteristic is comprised of a geographical area that corresponds to a zip code.

4. A method as in claim 1, wherein the steps of identifying, storing, comparing and declaring are executed only if the mobile station is classified as being in a prepaid mode of operation.

5. A method as in claim 1, and further comprising displaying a message to a user for informing the user that the user is operating in a prepaid mode with one of a plurality of system providers having system identifications that are associated with a geographical area that is the user's home geographical area.

6. A method as in claim 1, wherein the step of comparing includes a preliminary step of comparing the received system identification to the stored system identification that identifies the home service provider for the mobile station, and upon a match declaring the service provider to be the home service provider, and inhibiting the execution of the step of comparing the system identification received from a wireless service provider to the stored plurality of system identifications.

7. A method as in claim 1, wherein the common spatial characteristic is comprised of a geographical area that is defined by information received from a customer of a prepaid service provider.

8. A mobile station comprising:
a processor configured to access at least one memory and that is responsive to a received system identification for comparing received system identification to system identifications in a list of system identifications and, upon any one of the plurality of system identifications matching the received system identification, declaring a wireless service provider that transmitted the system identification as being a home service provider for the mobile station such that the mobile station is assumed to not be roaming and roaming charges are avoided, wherein the mobile station associated with a prepaid service provider comprises the at least one memory storing the system identification that identifies the home service provider for the mobile station and a list containing a plurality of other system identifications having a common spatial characteristic wherein if none of the plurality of other SIDs matches the received system identification, the processor compares a received system operator code to stored system operator codes found in an intelligent roaming data base and if a match is found between the received system operator code and one of the stored system operator codes, declaring a wireless service provider corresponding to the matched one of the stored system operator codes to be the home service provider.

9. A mobile station as in claim 8, wherein the common spatial characteristic is comprised of a postal zone.

10. A mobile station as in claim 8, wherein the common spatial characteristic is comprised of a geographical area that is defined by information received from a customer of the prepaid service provider.

11. A mobile station as in claim 8, wherein if none of the plurality of other system identifications matches the received system identification, the processor compares the received system identification to other stored system identifications found in an intelligent roaming data base.

12. A mobile station as in claim 8, and further comprising a display configured to display a message to a user for informing the user that the user is operating in a prepaid mode with one of a plurality of system providers having system identifications that are associated with a geographical area that is the user's home geographical area.

13. A mobile station as in claim 8, wherein the processor is configured to first compare the received system identification to the stored system identification that identifies the home service provider for the mobile station, and, upon a match, is configured to declare the service provider to be the home service provider, and inhibit comparing the received system identification with the list of other system identifications.

14. A mobile station as in claim 8, wherein the at least one memory is removable from the mobile station.

15. A mobile station as in claim 8, wherein the mobile station operates in a postpaid mode.

16. A mobile station as in claim 8, wherein the mobile station has both postpaid and prepaid modes.

17. An apparatus, comprising:
a wireless controller;
a wireless transceiver; and
at least one memory, the at least one memory comprising a location for storing a home system identification and other locations configured to store a plurality of cousin system identifications,
the wireless controller, in conjunction with the at least one memory, configured to cause the apparatus to perform actions as follows:
declare a system identification received through said wireless controller to be a home service provider if the received system identification matches the stored home system identification or any one of the plurality of stored cousin system identifications such that the apparatus is then considered to be non-roaming and roaming charges are avoided, wherein the at least one memory is configured to store the cousin system identifications under the direction of a prepaid service provider, and the cousin system identifications correspond to system identifications associated with one or more service providers that service a predetermined geographical area that is defined to be a non-roaming area of a customer of the prepaid service provider, wherein the home system identification is configured to be stored in at least one memory without the direction of the a prepaid service provider, wherein the wireless controller is configured to compare a received system operator code to stored system operator codes, including at least one of a partner system operator code, a favored system operator code and a forbidden system operator code if the wireless controller does not find a match for the received system identification with any of the plurality of stored system identifications, where if the wireless controller finds a match with the received system operator code and one of the partner system operator code and the favored system operator code, the controller configured to declare the wireless service provider corresponding to the matched one of the partner system operator code and the favored system operator code to be the home service provider.

18. An apparatus as in claim 17, wherein the cousin system identifications are configured to be stored in a memory that is detachable from said apparatus.

19. A method comprising:
storing, in at least one memory that is accessible by a mobile station, a first system identification that identifies a home service provider for the mobile station and a plurality of second system identifications;
comparing a system identification received from a wireless service provider to the first system identification and upon the received system identification matching the first system identification, declaring the wireless service provider to be a home category service provider for the mobile station; and
if the received system identification does not match the first system identification, comparing the received system identification to the plurality of second system identifications and upon the received system identification matching any one of the plurality of second system identifications, declaring the wireless service provider to be the home category service provider for the mobile station.

20. A method comprising:
storing, in at least one memory that is accessible by a mobile station, a first system identification that identifies a home service provider for the mobile station and a plurality of second system identifications;
comparing a system identification received from a wireless service provider to the plurality of second system identifications and upon the received system identification matching any one of the plurality of second system identifications, declaring the wireless service provider to be a home category service provider for the mobile station; and
if the received system identification does not match any one of the plurality of second system identifications, comparing the received system identification to the first system identification and upon the received system identification matching the first system identification, declaring the wireless service provider to be the home category service provider for the mobile station.

21. A method as in claim 20, wherein if the received system identification does not match the first system identification, comparing the received system identification to system identifications stored in an intelligent roaming data base system identification.

22. A method comprising:
storing, in at least one memory that is accessible by a mobile station, a system operator code that identifies a home service provider for the mobile station and a plurality of system identifications;
comparing a system operator code received from a wireless service provider to the stored system operator code and upon the received system operator code matching the stored system operator code, declaring the wireless service provider to be a home category service provider for the mobile station; and
if the received system operator code does not match the stored system operator code, comparing a related received system identification to the plurality of stored system identifications and upon the received system identification matching any one of the plurality of second system identifications, declaring the wireless service provider to be the home category service provider for the mobile station.

23. A method as in claim 22, wherein if the received system identification does not match any of the second system identifications, comparing the received system identification or system operator code to system identifications or system operator codes stored in an intelligent roaming data base.

24. A method comprising:
storing, in at least one memory that is accessible by a mobile station, a system operator code that identifies a home service provider for the mobile station and a plurality of system identifications;
comparing a system identification received from a wireless service provider to the plurality of stored system identifications and upon the received system identification matching any one of the plurality of stored system identifications, declaring the wireless service provider to be a home category service provider for the mobile station; and
if the received system identification does not match any one of the plurality of stored system identifications, comparing a received system operator code to the stored system operator code and upon the received system operator code matching the stored system operator code, declaring the wireless service provider to be the home category service provider for the mobile station.

25. A method as in claim 24, wherein if the received system operator code does not match the stored system operator code, comparing the received system identification or system operator code to system identifications or system operator codes stored in an intelligent roaming data base.

26. An apparatus, comprising:
a wireless controller;
a wireless transceiver controlled by the wireless controller; and
at least one memory, the at least one memory comprising a location for storing a system identification that identifies a home service provider for the apparatus,
wherein said wireless controller is configured to identify a plurality of system identifications having a common spatial characteristic; configured to store the identified plurality of system identifications having the common spatial characteristic in the at least one memory;
configured to compare a system identification received from a wireless service provider to the stored plurality of system identifications; and, upon any one of the plurality of stored system identifications matching the received system identification, configured to declare the corresponding wireless service provider as being a home service provider for the apparatus such that the apparatus is assumed to not be roaming and roaming charges are avoided, wherein if none of the plurality of stored system identifications matches the received system identification, the wireless controller is configured to compare a received system operator code to stored system operator codes, including at least one of a partner system operator code, a favored system operator code and a forbidden system operator code and if a match is found between the received system operator code and one of the partner and favored system operator codes, declare a wireless service provider corresponding to the matched one of the partner and favored system operator codes to be the home service provider.

27. An apparatus comprising:
a processor; and
a memory configured to store a computer program,
the processor, in conjunction with the memory and the computer program, being configured to cause the apparatus to perform actions as follows:

store, in at least one memory that is accessible by a mobile station, a first system identification that identifies a home service provider for the mobile station and a plurality of second system identifications;

compare a system identification received from a wireless service provider to the first system identification and upon the received system identification matching the first system identification, declare the wireless service provider to be a home category service provider for the mobile station; and if the received system identification does not match the first system identification, compare the received system identification to the plurality of second system identifications and upon the received system identification matching any one of the plurality of second system identifications, declare the wireless service provider to be the home category service provider for the mobile station.

28. An apparatus comprising:

a processor; and a memory configured to store a computer program, the processor, in conjunction with the memory and the computer program, being configured to cause the apparatus to perform actions as follows:

store, in at least one memory that is accessible by a mobile station, a first system identification that identifies a home service provider for the mobile station and a plurality of second system identifications;

compare a system identification received from a wireless service provider to the plurality of second system identifications and upon the received system identification matching any one of the plurality of second system identifications, declare the wireless service provider to be a home category service provider for the mobile station; and if the received system identification does not match any one of the plurality of second system identifications, compare the received system identification to the first system identification and upon the received system identification matching the first system identification, declare the wireless service provider to be the home category service provider for the mobile station.

29. An apparatus as in claim 28, wherein if the received system identification does not match the first system identification, the processor, in conjunction with the memory and the computer program, being configured to cause the apparatus to compare the received system identification to system identifications stored in an intelligent roaming data base system identification.

30. An apparatus comprising:

a processor; and a memory configured to store a computer program, the processor, in conjunction with the memory and the computer program, being configured to cause the apparatus to perform actions as follows:

store, in at least one memory that is accessible by a mobile station, a system operator code that identifies a home service provider for the mobile station and a plurality of system identifications;

compare a system operator code received from a wireless service provider to the stored system operator code and upon the received system operator code matching the stored system operator code, declare the wireless service provider to be a home category service provider for the mobile station; and if the received system operator code does not match the stored system operator code, compare a related received system identification to the plurality of stored system identifications and upon the received system identification matching any one of the plurality of second system identifications, declare the wireless service provider to be the home category service provider for the mobile station.

31. An apparatus as in claim 30, wherein if the received system identification does not match any of the second system identifications, the processor, in conjunction with the memory and the computer program, being configured to cause the apparatus to compare the received system identification or system operator code to system identifications or system operator codes stored in an intelligent roaming data base.

32. An apparatus comprising:

a processor; and a memory configured to store a computer program, the processor, in conjunction with the memory and the computer program, being configured to cause the apparatus to perform actions as follows:

store, in at least one memory that is accessible by a mobile station, a system operator code that identifies a home service provider for the mobile station and a plurality of system identifications;

compare a system identification received from a wireless service provider to the plurality of stored system identifications and upon the received system identification matching any one of the plurality of stored system identifications, declare the wireless service provider to be a home category service provider for the mobile station; and if the received system identification does not match any one of the plurality of stored system identifications, compare a received system operator code to the stored system operator code and upon the received system operator code matching the stored system operator code, declare the wireless service provider to be the home category service provider for the mobile station.

33. An apparatus as in claim 32, wherein if the received system operator code does not match the stored system operator code, the processor, in conjunction with the memory and the computer program, being configured to cause the apparatus to compare the received system identification or system operator code to system identifications or system operator codes stored in an intelligent roaming data base.

* * * * *